United States Patent [19]

Kamemoto

[11] Patent Number: 4,954,882
[45] Date of Patent: Sep. 4, 1990

[54] COLOR TELEVISION SET HAVING A TELETEXT RECEIVER BUILT-IN

[75] Inventor: Kazuhiro Kamemoto, Saitama, Japan

[73] Assignee: Kabushiki Kaisha Toshiba, Kawasaki, Japan

[21] Appl. No.: 380,028

[22] Filed: Jul. 14, 1989

[30] Foreign Application Priority Data

Aug. 19, 1988 [JP] Japan .................................. 63-208602

[51] Int. Cl.⁵ ......................... H04N 3/22; H04N 5/262
[52] U.S. Cl. ..................................... 358/22; 358/21 R
[58] Field of Search ............... 358/21 R, 22, 183, 147, 358/160, 180

[56] References Cited

U.S. PATENT DOCUMENTS 4,233,628 11/1980 Ciciora .................................. 358/180
4,750,039 6/1988 Willis ..................................... 358/22
4,771,217 9/1968 Yamanaka .

FOREIGN PATENT DOCUMENTS 40-15285 7/1965 Japan .
56-39594 9/1981 Japan .
61-28451 8/1986 Japan .
61-193580 8/1986 Japan .

Primary Examiner—Howard Britton
Assistant Examiner—Amir Zarabian
Attorney, Agent, or Firm—Cushman, Darby & Cushman

[57] ABSTRACT

A demodulating means receiving television broadcasting electric waves and demodulating the received television video signal and multiplexed teletext signal respectively to primary color signals of R, G and B and a double speed converting means for time-axially compressing within one horizontal period the demodulated R, G and B primary color signals of both are provided so that the television video signal and teletext signal double speed converted within opne horizontal scanning period may be alternately switched by a first switching means and may be displayed on a picture tube through a driving means. Further, in the case of displaying them, by a deflecting means, the vertical amplitude can be made smaller than at the normal time and the vertical picture position can be set in a proper position. Thereby, a television video signal and teletext signal in which the horizontal amplitude and vertical amplitude are set to be, for example, ½ those at the normal time can be simultaneously displayed on the picture tube.

13 Claims, 6 Drawing Sheets

COLOR TELEVISION SET HAVING A TELETEXT RECEIVER BUILT-IN

Background of the Invention:

1. Field of the Invention:

This invention relates to a color television set having a teletext receiver built-in wherein a teletext receiver is built-in and a teletext signal and television signal can be simultaneously displayed on a receiver tube.

2. Description of the Related Art:

Recently, a color television set having a teletext receiver built-in has been developed and commercialized. This kind of color television set is formed as shown in FIG. 6.

In FIG. 6, the reference numeral 1 represents an antenna and 2 represents a receiving circuit for receiving televised electric waves and taking out composite video signals of a base band. The composite video signals from this receiving circuit 2 are simultaneously fed to a video chromatic signal processing circuit 3, teletext signal receiving circuit 4 and synchronizing separator circuit 8. The video chromatic signal processing circuit 3 is a circuit for demodulating a composite video signal and taking out three primary color signals of R (red), G (green) and B (blue). The teletext signal receeiving circuit 4 is a circuit for taking out teletext signals superimposed on the composite video signals and converting them to primary color signals of R, G and B. The televisiion video signals from the video chromatic signal processing circuit 3 and teletext signals from the teletext signal receiving circuit 4 are fed to a switching circuit 5 by a switch means $SW_1$. One signal is selectively switched by this circuit 5, is fed to a picture tube driving circuit 6 and is displayed in a picture tube 7. The switching circuit 5 is switched by a control signal from a controller 11. The horizontal synchronizing signal and vertical synchronizing signal separated by the above mentioned synchronizing separator circuit 8 are fed respectively to a horizontal deflection circuit 9 and vertical deflection circuit 10.

In the thus formed television set, the ordinary television video signal and teletext signal are switched alternately by the switching circuit 5 but two kinds of switching operation are made possible by the control of a controller 11. That is to say, first of all, the switch $SW_1$ of the switching circuit 5 is constantly connected to either one signal. In this case, the other signal may not be displayed. Second, while the television video signal is being displayed, by switching the switch $SW_1$, the teletext signal is superimposed onlY on the picture or teletext section of the teletext signal. In this case, there has been a defect that, though the contents of both signals can be confirmed, the information amount will lack.

As mentioned above, in the conventional color television set having a teletext receiver built-in, a teletext signal and a television video signal can not be simultaneously displayed on the picture tube without lacking the information amount.

Object and Summary of the Invention:

The present invention has it as an object to provide a color television set having a teletext receiver built-in wherein a teletext signal and television video signal can be simultaneously displayed without lacking the information amount.

That is to say, a color television set having a teletext receiver built-in of the present invention comprises:

a demodulating means receiving television broadcasting electric waves, demodulating the received television video signal and multiplexed teletext signal to primary color signals of R, G and B and reproducing a synchronizing signal;

a double speed converting means time-axially compressing within one horizontal scanning period the television video signal and teletext signal demodulated by this demodulating means;

a switching means including a switch means capable of alternately switching and leading out within one horizontal scanning period the television video signal and teletext signal time-axially compressed by this double speed converting means;

a driving means feeding to a picture tube the output signals from this switching means;

a deflecting means feeding a horizontal deflection curent and vertical deflection current to a deflection yoke of the picture tube on the basis of the horizontal and vertical synchronizing signals from the above mentioned demodulating means and capable of changing a vertical amplitude and vertical picture position with the control of the amplitude and direct current component of the vertical deflection current; and a control means controlling the switching operation of the above mentioned switching means and the vertical amplitude change and vertical picture position change of the above mentioned deflecting means.

Brief Description of the Drawings:

FIG. 6 is a block diagram showing a conventional color television set having a teletext receiver built-in.

Figure 1:
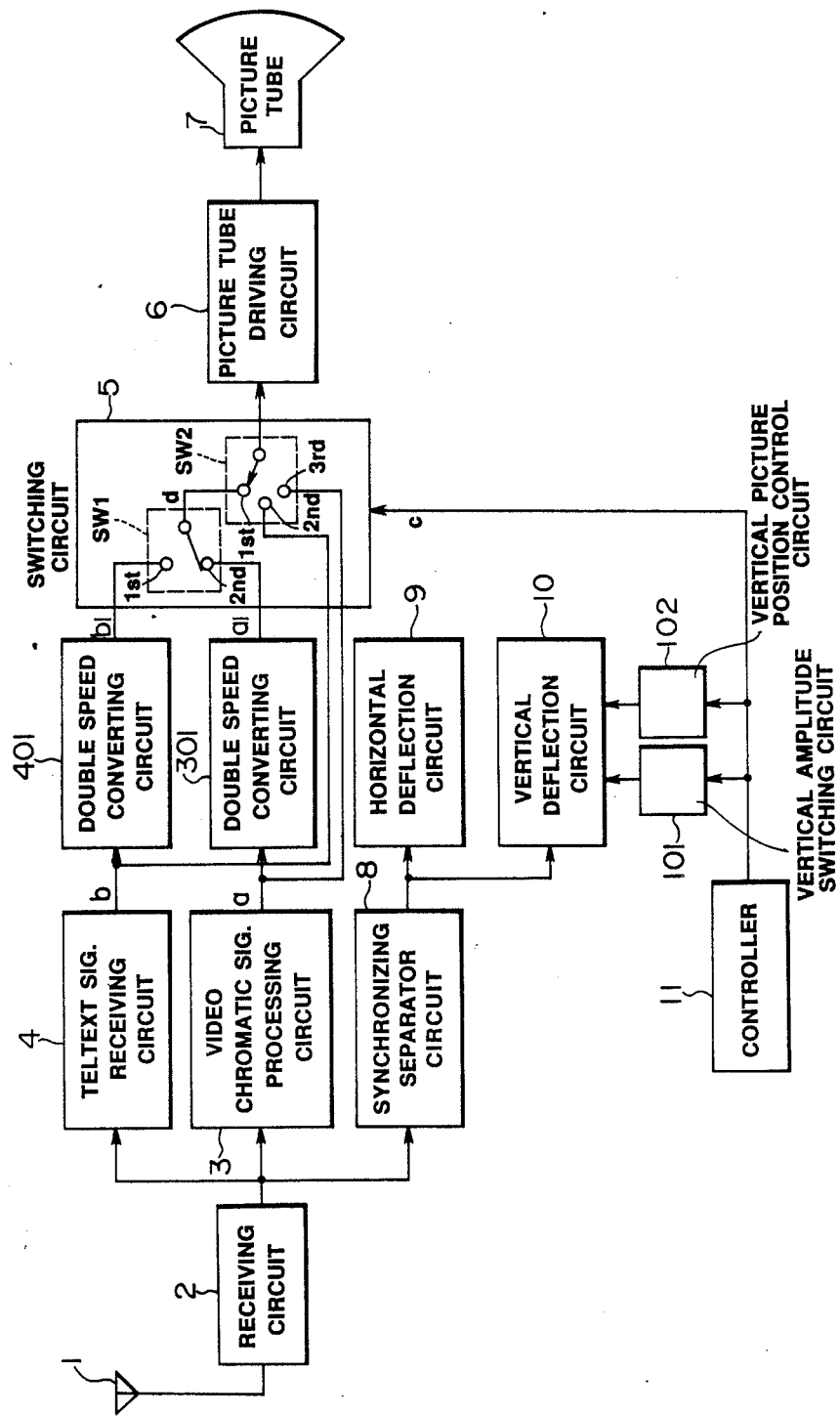
FIG. 1 is a block diagram showing a color television set having a teletext receiver built-in of an embodiment of the present invnention.
Figure 6:
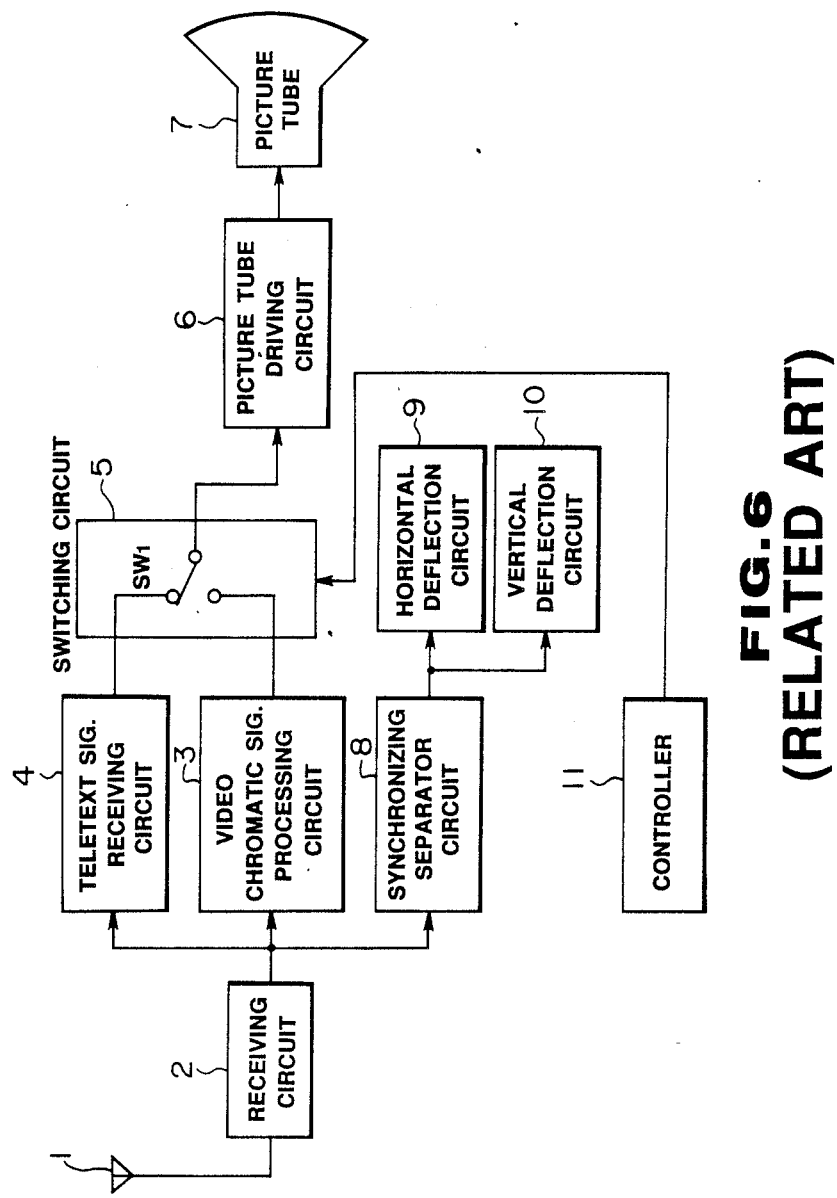

Detailed Description of the Preferred Embodiment:

FIG. 1 is a block diagram showing a color television set having a teletext receiver built-in of an embodiment of the present invention. In this diagram, the same reference numerals are affixed to the same componets as in FIG. 6. That is to say, an antenna 1, receiving circuit 2, video chromatic signal processing circuit 3, teletext signal receiving circuit 4, switching circuit 5, picture tube driving circuit 6, picture tube 7, synchronizing separator circuit 8, horizontal deflection circuit 9, vertical deflection circuit 10 and controller 11 are the same components as in FIG. 6. Differences in FIG. 1 from the prior art example are that double speed converting circuits 401 and 301 are provided in the steps respectively after the teletext signal receiving circuit 4 and video chromatic signal signal processing circuit 3, that a switching means $SW_2$ is newly provided in the switching circuit 5 and that a vertical amplitude switching circuit 101 and vertical picture position controlling circuit 102 are provided in the vertical deflection circuit 10. Two switching means $SW_1$ and $SW_2$ are formed with respect to the above mentioned switching circuit 5. The output from the double speed converting circuit 401 is fed to the first input end of the switch means $SW_1$. The output from the double speed converting circuit 301 is fed to the second input end of $SW_1$. The output from the output terminal of the switch means $SW_1$ is fed to the first input end of the switch means $SW_2$. The output from the teletext signal receiving circuit 4 is fed to the second input end of $SW_2$. The output from the video chromatic signal processing circuit 3 is fed to the third input end of $SW_2$. The output from the output terminal of $SW_2$ is fed to the picture tube driving circuit 6. By the way, the above mentioned vertical amplitude switching circuit 101, vertical picture position controlling circuit 102 and switch means $SW_1$ and $SW_2$ of the switching circuit 5 are to be controlled by the control signal from the controller 11.

Figure 2:
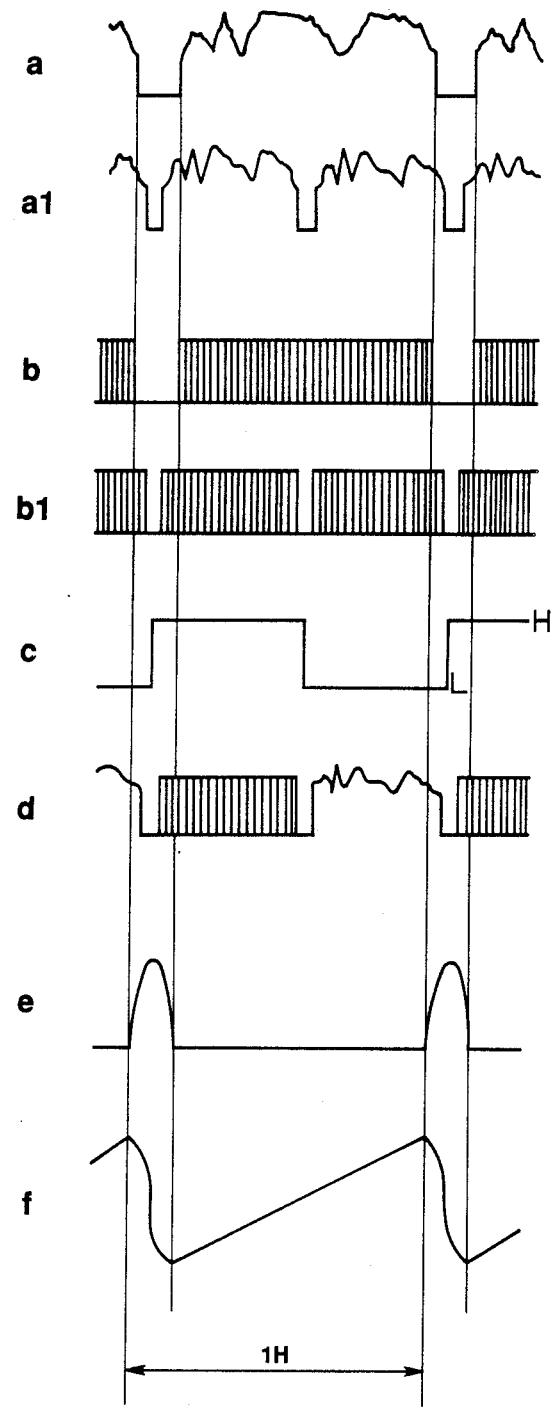
FIG. 2 is a waveform diagram for explaining the operation in FIG. 1.

The operation of the above mentioned circuit shall be explained in the following with reference to FIG. 2 which shows timings of signal waveforms of the respective parts of the circuit. FIG. 2a shows waveforms of R, G and B output signals of the video chromatic signal processing circuit 3 and FIG. $2a_1$ shows signal waveforms when the signal a is double speed-converted by the double speed converting circuit 301. FIG. 2b shows waveforms of R, G and B output signals of the teletext signal receiving circuit 4. FIG. $2b_1$ shows signal waveforms when the signal b is double speed-converted by the double speed converting circuit 401. FIG. 2c shows a control signal fed to the switch means $SW_1$ of the switching circuit 5 from the controller 11. This control signal is a signal repeating a high (H) level and low (L) level at intervals of ½ period of one horizontal scanning period (1H). Therefore, the switch means $SW_1$ will selectively output signals $a_1$ and $b_1$ at the intervals of ½ H by the control signal c and, as shown in FIG. 2d, the signal d having passed through the $SW_1$ will have the teletext signals and television video signals compressed and alternately arranged within one horizontal scanning period. By the way, FIGS. 2e and f show waveforms of a horizontal flyback pulse and horizontal deflection current in the horizontal deflection circuit 9. The phase relation of the picture signal d fed to the picture tube 7 can be confirmed by these waveforms.

In the switch means $SW_2$, if the output terminal is switched to the first input end by the control of the controller 11, as described above, the teletext signal and television video signal will be displayed as compressed on one picture surface, if it is switched to the second input end, the teletext signal b before the double speed conversion will be able to be fed to the picture tube driving circuit 6 from the teletext signal receiving circut 4 and further, if it is switched to the third input end, the television video signal a before the double speed conversion will be able to be fed to the picture tube driving circuit 6 from the video chromatic signal processing circuit 3. Thus, by switching the switch means $SW_2$, the normal state before the double speed conversion can be returned.

Figure 3:
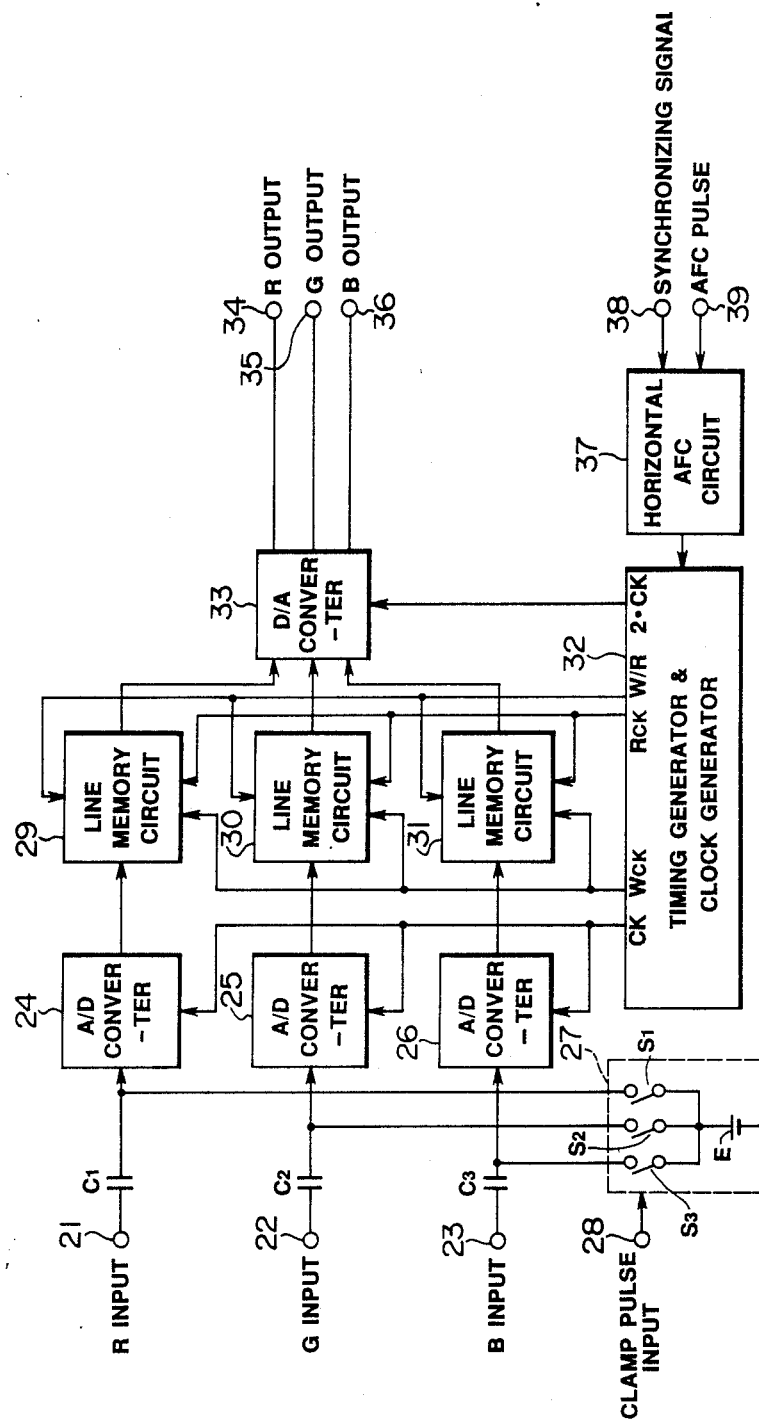
FIG. 3 is a block diagram showing an example of a double speed converting circuit in FIG. 1.

FIG. 3 shows an example of the formation of the above mentioned double speed convereting circuit 401 or 301 which is a known circuit. It shall be briefly explained. R, G and B signals input through condensers $C_1$, $C_2$ and $C_3$ from terminals 21, 22 and 23 are clamped by using a clamping circuit 27 so as to conform to the input ranges of A/D converters and are input into A/D converters 24, 25 and 26. The clamping circuit 27 is formed of a voltage source E feeding a clamping voltage and switches $S_1$, $S_2$ and $S_3$ for feeding the clamping voltage to the respective signals of R, G and B in the period when the clamping pulses from the terminal 28 are present. The A/D converters 24, 25 and 26 convert the respective signals of R, G and B to digital signals and feed them to line memory circuits 29, 30 and 31 which read out the signals at a speed double the writing speed and double speed-convert the respective signals of R, G and B. The line memory circuits are of a 2H type. Two line memories are used to alternately write in and read out the signals of the two line memories. That is to say, in the line memory circuits, the signal data written in the first 1H into one line memory are read out (twice continuously) at a double speed in the next 1H and, while the signal data are being written into one line memory, they will be read out of the other line memory. The writing in and reading out are switched to each other by the writing/reading (W/R) signal from a timing generator and clock generator 32. In such case, when a clock signal RCK at the time of reading out is made to be of a frequency twice as high as of a clock signal WCK at the time of writing in, it will be able to be time-axially compressed (picture-compressed). This time-axially compressed signal is returned to an analogue signal by the D/A converter 33 to obtain at the terminals 34, 35 and 36 double speed-converted R, G and B signals. By the way, the frequency of the clock signal fed to the A/D converter 33 from the timing generator and clock generator 32 is made twice as high as the frequency of the clock signal fed to the converters 24, 25 and 26. An automatic frequency controlled (AFC) horizontal synchronizing signal is fed to the timing generator and clock generator 32 from a horizontal AFC circuit 37. A horizontal synchronizing signal and AFC pulse are fed to the horizontal AFC circuit 37 from terminals 38 and 39.

Figure 4:
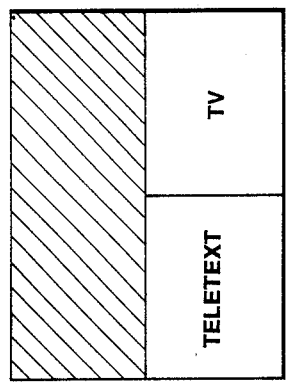
FIG. 4 is an explanatory view showing displaying examples on picture tube surfaces in FIG. 1.
Figure 4:
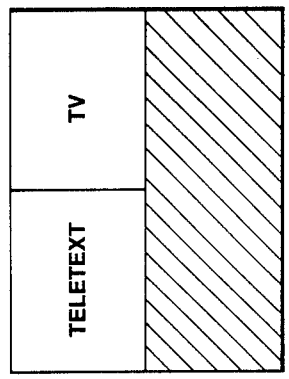
Figure 4:
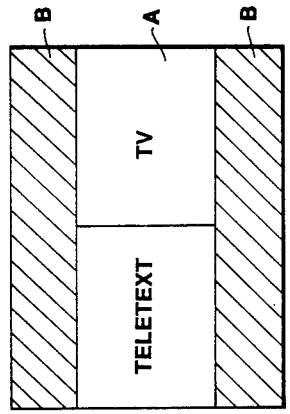

Further, in the above mentioned circuit operation in FIG. 1, if the vertical amplitude is made half that at the time of the normal operation by a vertical amplitude switching circuit 101, such picture as is shown in FIG. 4(a) will be formed on the picture tube 7. That is to say, the teletext signal and television video signal will be respectively of a size of ½ the picture area at the normal time and will be displayed simultaneously on the right and left. As the picture is compressed in the horizontal direction by the digital signal processing circuit and the scanning amplitude is contracted in the vertical direction, the number of scanning lines will not vary and the picture quality will not deteriorate.

However, if the picture is displayed for a long time with the vertical amplitude contracted as in FIG. 4(a), the deterioration of the fluorescent body of the picture tube 7 will be different between the part A showing the picture and the part B not scanned (hatched part in the illustration) and will appear as an uneven picture luminance to the disadvantage.

That is to say, if the switch means $SW_2$ in the switching circuit 5 in FIG. 1 is switched to the second or third input end, the signal from the circuit 4 or 3 is fed as it is to the picture tube driving circuit 6 and at the same time the vertical amplitude is made to be as usual by the vertical amplitude switching circuit 101, a television video signal or teletext signal ordinary on the entire surface will be able to be displayed on the picture tube 7. On the other hand, as in FIG. 4(a), if the vertical amplitude is made half and the video image is displayed only on the middle part A of the picture surface but is not displayed on the upper and lower parts B, the light emitting efficiency of the fluorescent body of the CRT in the displaying part will deteriorate more than in the non-displaying part and, in case the display is switched to the ordinary entire surface display, a luminance difference will be produced between the middle part and the upper and lower parts of the picture surface and will be likely to appear as an uneven picture luminance.

In order to eliminate such disadvantages, as shown in FIG. 1, a vertical picture position controlling circuit 102 is added so that the picture position may be changed as shown in FIGS. 4(b) and (c) as required. The timing of changing the picture position is variously possible. For example, whenever the vertical amplitude is contracted, the position may be changed as a random number or may be gradually changed while the picture is being seen. Such change depends all on the control of the controller 11. The above mentioned position control can be realized by using a microcomputer for the controller 11.

Figure 5:
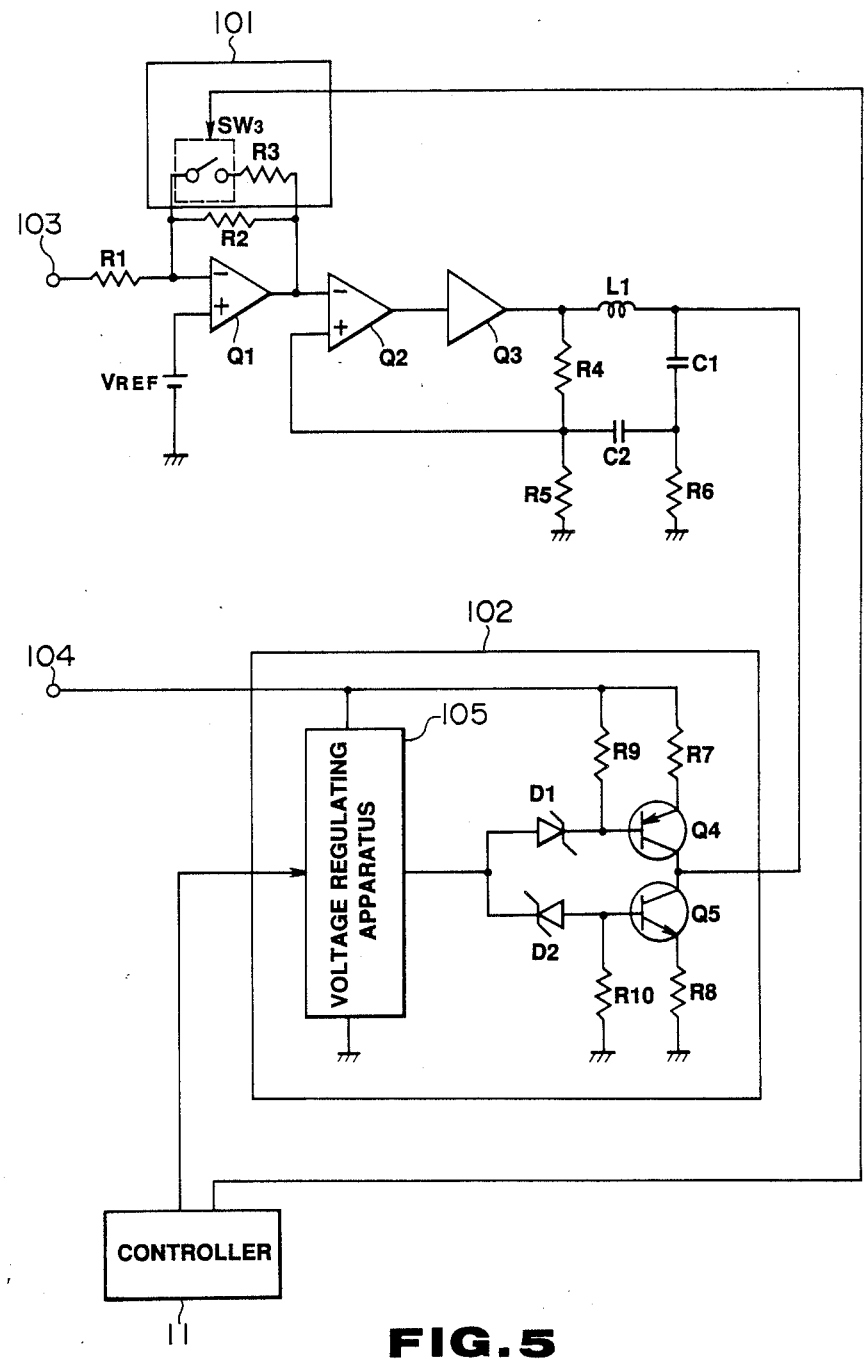
FIG. 5 is a circuit diagram showing examples of a vertical deflection circuit, vertical amplitude switching circuit and vertical picture position controlling circuit in FIG. 1.

FIG. 5 is a circuit diagram showing an example of the formation of the vertical deflection circuit 10, vertical amplitude switching circuit 101 and vertical picture position controlling circuit 102 in FIG. 1.

In FIG. 5, the reference numeral 103 represents a vertical sawtooth wave input terminal to which serrated waves synchronized with a vertical synchronizing signal are fed from a sawtooth wave generating circuit. The terminal 104 is a current source feeding terminal. The sawtooth wave signal input into the terminal 103 is fed to an inverted amplifier $Q_1$ through an input resistance $R_1$. The inverted amplifier $Q_1$ is of an operating amplifier formation. A reference current source $V_{REF}$ is connected to a (+) input terminal. A feedback resistance $R_2$ and vertical amplitude switching circuit 101 are parallelly connected between a (−) input terminal and output terminal. In the formation of the vertical amplitude switching circuit 101, a series circuit of a switch $SW_3$ and resistance $R_3$ is connected in parallel to the above mentioned resistance $R_2$ and the switch $SW_3$ is controlled to be on and off by a control signal from the controller 11. When the switch $SW_3$ is on, the amplification rate G of the inverse amplifier $Q_1$ will be represented by the ratio of the feedback resistance $R_2$ to the input resistance $R_1$ as follows:

$$-G = R_2/R_1$$

Here, if the switch $SW_3$ is switched on, the amplification rate will be:

$$-G = \{R_2 \cdot R_3/(R_2+R_3)\}/R_1.$$

If $R_2 = R_3$ is selected, $$-G = R_2/2R_1.$$

Thus, the sawtooth wave amplitude width will reduce to be half.

The output terminal of the inverted amplifier $Q_1$ is connected to the (−) input terminal of the operation amplifier $Q_2$ in the next step and the output terminal of $Q_2$ is connected to an amplifier $Q_3$ in the last step. The output terminal of the amplifier $Q_3$ is connected to one end of a vertical deflection coil $L_1$ and to voltage feedback resistances $R_4$ and $R_5$. The other end of the deflection coil $L_1$ is connected to a reference potential point through a coupling condenser $C_1$ and current detecting resistance $R_6$ and is also connected to a vertical picture position controlling circuit 102.

The voltage corresponding to the deflection current detected by the current detecting resistance $R_6$ is fed to the connecting point of voltage feedback resistances $R_4$ and $R_5$ through a condenser $C_2$ and is fed back to the (+) input terminal of the above mentioned operation amplifier $Q_2$ so that the operation potential of the amplifier $Q_3$ may be determined and a sawtooth wave current equivalent to the input sawtooth wave signal may be flowed to the deflection coil $L_1$.

Further, in addition to the above circuit formation, if a direct current voltage is fed to one end of the deflection coil $L_1$, a direct current will flow to the deflection coil $L_1$ by the difference voltage from the output potential of the amplifier $Q_3$ and the vertical picture position will be able to be controlled. For this purpose, a vertical picture position controlling circuit 102 is provided. This vertical picture position controlling circuit is disclosed in U.S. patent application Ser. No. 30057 (U.S. Pat. No. 4,771,217) filed on Mar. 25, 1987 by the Applicant of the present case. That is to say, in FIG. 5, in the vertical picture position controlling circuit 102, the respective collectors of a pair of PNP type transistor $Q_4$ and NPN type transistor $Q_5$ are commonly connected, the emitter of the above mentioned PNP type transistor $Q_4$ is connected to a direct current source terminal 104 through a resistance $R_7$, the emitter of the above mentioned NPN type transistor $Q_5$ is connected to the reference potential point through a resistance $R_8$, the base of the above mentioned PNP type transistor $Q_4$ is connected to the direct current source terminal 104 through a resistance $R_9$, the base of the PNP type transistor $Q_4$ is connected to the base of the above mentioned NPN type transistor $Q_5$ through first and second Zener diodes $D_1$ and $D_2$ in series, the base of the above mentioned NPN type transistor $Q_5$ is connected to the reference potential point through a resistance $R_{10}$ and a direct current voltage is fed to one end of the above mentioned vertical deflection coil $L_1$ from the common collector of the above mentioned PNP type transistor $Q_4$ and NPN type transistor $Q_5$ to form a complementary output circuit. Further, the output end of a voltage regulating circuit 105 in which the output voltage value is regulated by the control signal is connected to the series connecting point of the above mentioned first and second Zener diodes $D_1$ and $D_2$ in the above mentioned complementary output circuit in the formation. In this circuit, the voltage regulating circuit 105 is connected to the direct current source terminal 104 to regulate the direct current voltage value output by the control signal from the controller 11.

In this circuit 102, a pair of transistors $Q_4$ and $Q_5$ are connected to the complementary output circuit and respectively form constant current circuits together with the Zener diodes $D_1$ and $D_2$ connected to the respective bases. When the output voltage of the voltage regulating circuit 105 is fed to the bases of the above mentioned transistors $Q_4$ and $Q_5$ through the above mentioned Zener diodes $D_1$ and $D_2$, the operating current of the above mentioned two constant current circuits will be regulated by the voltage regulating circuit 105 (that is, regulated by the control signal from the controller 11) and a proper direct current voltage will be fed to the deflection coil $L_1$. Thereby, a picture position adjusting current containing no ripple current can be fed to the deflection coil $L_1$.

In the vertical deflection circuit formed as in the above, if the switch $SW_3$ of the vertical amplitude switching circuit 101 is switched on and off and the voltage regulaing circuit 105 of the vertical picture position controlling circuit 102 is operated to regulate the voltage, the vertical picture amplitude and vertical picture position will be able to be controlled.

As described above, according to the present invention, a teletext signal and television video signal can be simultaneously displayed on a picture tube without lacking the information amount.

By the way, the present invention is not limited to the above mentioned embodiment but can be variously modified in a range not deviating from the subject matter of the invention.

What is claimed is:

1. A color television set having a teletext receiver built-in comprising:
   a demodulating means receiving television broadcasting electric waves, demodulating the received television video signal and multiplexed teletext signal to primary color signals of R (red), G (green) and B (blue) and reproducing a synchronizing signal;
   a double speed converting means time-axially compressing within one horizontal scanning period the television video signal and teletext signal demodulated by said demodulating means;
   a switching means including a switch means capable of alternately switching and leading out within one horizontal scanning period the television video signal and teletext signal time-axially compressed by said double speed converting means;
   a driving means feeding to a picture tube the output signal from said switching means;
   a deflecting means feeding a horizontal deflection current and vertical deflection current to a deflection yoke of the picture tube on the basis of the horizontal and vertical synchronizing signals from said demodulating means and capable of changing a vertical amplitude and vertical picture position with the control of the amplitude and direct current component of the vertical deflection current; and
   a control means controlling the switching operation of said switching means and the vertical amplitude change and vertical picture position change of said deflecting means.

2. A color television set having a teletext receiver built-in according to claim 1 wherein said demodulating means comprises:
   a receiving means receiving television broadcasting electric waves and taking out a composite video signal of a base band;
   a video chromatic signal processing means demodulating the composite video signal from said receiving means and taking out three primary colors of R, G and B;
   a teletext signal receiving means for taking out the teletext signal superimposed on the composite signal from said receiving means and converting it to primary color signals of R, G and B; and
   a synchronizing separating means for separating a horizontal synchronizing signal and vertical synchronizing signal from the composite video signal from said receiving means.

3. A color television set having a teletext receiver built-in according to claim 1 wherein said double speed converting means comprises:
   a first double speed converting means time-axially compressing within one horizontal scanning period the television video signals of R, G and B demodulated by said demodulating means; and
   a second double speed converting means time-axially compressing within one horizontal scanning period the teletext signals of R, G and B demodulated by said demodulating means.

4. A color television set having a teletext receiver built-in according to claim 3 wherein said first double speed converting means comprises:
   a clamping circuit inputting and clamping on a predetermined level the television video signals of R, G and B demodulated by said demodulating means;
   an analogue-digital converting circuit converting said clamped R, G and B signals to digital signals;
   a line memory circuit writing in in the first one horizontal scanning period said analogue-digital converted R, G and B signals, reading them out in the next one horizontal scanning period at a speed double or substantially double the writing speed and double speed converting the respective signals of R, G and B;
   a digital-analogue converting circuit converting to analogue signals the R, G and B signals read out of said line memory circuit to obtain double speed converted R, G and B signals; and
   a timing and clock signal generating means feeding clock signals to said analogue-digital converting circuit, line memory circuit and digital-analogue converting circuit and feeding to said line memory circuit a timing signal switching writing in and reading out.

5. A color television set having a teletext receiver built-in according to claim 3 wherein said second double speed converting means comprises:
   a clamping circuit inputting and clamping on a predetermined level the teletext signals of R, G and B demodulated by said demodulating means;
   an analogue-digital converting circuit converting the clamped R, G and B signals to digital signals;
   a line memory circuit writing in in the first one horizontal scanning period the analogue-digital converted R, G and B signals, reading them out in the next one horizontal scanning period at a speed double or substantially double the writing speed and double speed converting the respective signals of R, G and B;
   a digital-analogue converting circuit converting to analogue signals the R, G and B signals read out of said line memorY means to obtain double speed converted R, G and B signals; and
   a timing and clock signal generating means feeding clock signals to said analogue-digital converting circuit, line memory circuit and digital-analogue converting circuit and feeding to said line memorY circuit a timing signal switching writing in and reading out.

6. A color television set having a teletext receiver built-in according to claim 1 wherein said switching means comprises:
   a first switch means alternately switching and leading out within one horizontal scanning period the television video signal and teletext signal time-axially compressed by said double speed converting means; and a second switch means selectively switching the signal before being time-axially compressed by the television video signal or teletext signal from said demodulating means and the output signal from said first switch means; and the signal from said second switch means is fed to a picture tube through said driving means.

7. A color television set having a teletext receiver built-in according to claim 6 which is controlled so that, when said second switch means selects and outputs the output signal from said first switch means, the vertical amplitude will be made smaller than the usual amplitude and when said second switch means selects and outputs the signal before being time-compressed, the the vertical amplitude will be the usual amplitude and the vertical picture surface position will be fixed.

8. A color television set having a teletext receiver built-in according to claim 6 wherein said first switch means comprises:
   a first input end inputting the television video signal time-axially compressed by said double speed converting means;
   a second input end inputting the teletext signal time-axially compressed by said double speed converting means; and
   an outputting means outputting one of the signals from said two input ends as alternately switched by using a control signal.

9. A color television set having a teletext receiver built-in according to claim 6 wherin said second switch means comprises:
   a third input end inputting the output signal from said first switch means;
   a fouth input end inputting the television video signal before being time-axially compressed from said demodulating means;
   a fifth input end inputting the teletext signal before being time-axially compressed from said demodulating means; and
   an outputting means outputting one of the signals input into said three input ends as switched by using a control signal.

10. A color television set having a teletext receiver built-in according to claim 1 wherein said deflecting means comprises:
    a horizontal deflecting circuit feeding a horizontal deflection current to a deflection yoke of the picture tube on the basis of the horizontal synchronizing signal from said demodulating means;
    a vertical deflecting circuit feeding a vertical deflection current to the deflection yoke of the picture tube on the basis of the vertical synchronizing signal from said demodulating means;
    a vertical amplitude switching circuit capable of changing the amplitude of the vertical deflection current of said vertical deflecting circuit by using a control signal; and
    a vertical picture surface position controlling circuit capable of changing the vertical picture surface position by controlling the direct current component of the vertical deflection current of said vertical deflecting circuit.

11. A color television set having a teletext receiver built-in according to claim 10 wherein said vertical deflecting circuit comprises:

a sawtooth wave generating circuit generating a vertical sawtooth wave signal synchronized with a vertical synchronizing signal;

an inverted amplifier inputting into an inverted input terminal the vertical sawtooth wave signal from said sawtooth wave generating circuit, connecting a reference voltage source to a non-inverted input terminal, connecting a feedback resistance between the inverted terminal and output terminal and inversely amplifying said vertical sawtooth wave signal;

a differential amplifier inputting into an inverted input terminal the sawtooth wave signal from said inverted amplifier, feeding a feedback voltage to a non-inverted input terminal and differentially amplifying the signal;

a final step amplifier amplifying the sawtooth wave signal from said differential amplifier;

a vertical deflecting coil connected at one end to the output terminal of said final step amplifier;

a voltage feedback circuit consisting of first and second resistances connected in series between the output terminal of said final step amplifier and a reference potential point;

a coupling condenser and current detecting third resistance connected in series between the other end of said vertical deflecting coil and the reference potential point; and a feedback means feeding the voltage corresponding to the vertical deflection current detected by said third resistance to the connecting point of said first and second resistances through a condenser and feeding said voltage back to the non-inverted input terminal of said differential amplifier.

12. A color television set having a teletext receiver built-in according to claim 11 wherein said vertical amplitude switching circuit connects a series circuit of a switch circuit and resistance in parallel with the feedback resistance of said inverted amplifier so that the amplitude of the vertical sawtooth wave signal may be switched by switching on and off said switch circuit.

13. A color television set having a teletext receiver built-in according to claim 11 wherein said vertical picture position controlling circuit comprises:
   a complementary output circuit wherein the respective collectors of a pair of PNP type transistor and NPN type transistor are commonlY connected, the emitter of said PNP type transistor is connected to a direct current source through a first resistance, the emitter of said NPN type transistor is connected to the reference potential point through a second resistance, the base of said PNP type transistor is connected to the direct current source through a third resistance and is connected to the base of said NPN type transistor through first and second Zener diodes in series, the base of said NPN type transistor is connected to the reference potential point through a fourth resistance and a direct current voltage is fed to one end of said vertical deflection coil from the common collector of said PNP type transistor and NPN tYpe transistor; and
   a voltage regulating circuit connected to the direct current source wherein the output direct current voltage value is regulated by a control signal and the output voltage is fed to the series connecting point of said first and second Zener diodes in said complementary output circuit.

* * * * *